(12) United States Patent
Hoffman

(10) Patent No.: US 6,875,081 B2
(45) Date of Patent: Apr. 5, 2005

(54) METHOD OF MANUFACTURING A TOOL USING A ROTATIONAL PROCESSING APPARATUS

(75) Inventor: Steve Hoffman, Englewood Cliffs, NJ (US)

(73) Assignee: Mikronite Technologies Group Inc., Carlstadt, NJ (US)

( * ) Notice: Subject to any disclaimer, the term of this patent is extended or adjusted under 35 U.S.C. 154(b) by 0 days.

(21) Appl. No.: 10/657,062

(22) Filed: Sep. 5, 2003

(65) Prior Publication Data

US 2004/0045408 A1 Mar. 11, 2004

Related U.S. Application Data

(63) Continuation-in-part of application No. 09/965,162, filed on Sep. 27, 2001, and a continuation-in-part of application No. PCT/US02/03272, filed on Feb. 5, 2002.

(51) Int. Cl.[7] .............................. B24B 1/00; B24B 31/00
(52) U.S. Cl. .......................... 451/32; 451/34; 451/326; 451/327
(58) Field of Search .......................... 451/32, 34, 236, 451/237, 238, 239

(56) References Cited

U.S. PATENT DOCUMENTS

| | | | |
|---|---|---|---|
| 1,512,350 A | 10/1924 | McCorkle et al. | |
| 2,550,630 A | 4/1951 | Whitehead | |
| 3,034,378 A | 5/1962 | Anderson | |
| 3,107,706 A | 10/1963 | Heinemann | |
| 3,233,372 A | 2/1966 | Kobayashi | |
| 3,316,678 A * | 5/1967 | Poltorak | 451/65 |
| 3,464,163 A * | 9/1969 | Ferrara | 451/113 |
| 3,513,604 A | 5/1970 | Matsunaga et al. | |
| 4,073,095 A | 2/1978 | Dreher | |
| 4,280,302 A | 7/1981 | Ohno | |
| 4,566,144 A * | 1/1986 | Arneson | 15/3 |
| 4,580,371 A | 4/1986 | Akhavi | |
| 4,586,292 A | 5/1986 | Carroll et al. | |
| 4,800,605 A * | 1/1989 | Arneson | 15/3 |
| 4,967,514 A | 11/1990 | Kunz | |
| 5,140,783 A | 8/1992 | Hoffman | |
| 5,197,271 A * | 3/1993 | Robbins et al. | 451/326 |
| 5,295,330 A | 3/1994 | Hoffman | |
| 5,355,638 A * | 10/1994 | Hoffman | 451/32 |
| 5,454,749 A | 10/1995 | Ohno | |
| 5,507,685 A | 4/1996 | Hoffman | |
| 5,848,929 A | 12/1998 | Hoffman | |
| 5,896,800 A | 4/1999 | Curtsinger et al. | |
| 6,035,844 A | 3/2000 | Otani et al. | |
| 6,067,888 A | 5/2000 | Achterberg et al. | |
| 6,293,020 B1 | 9/2001 | Julien | |
| 6,364,754 B1 * | 4/2002 | Bagdasarian | 451/328 |
| 6,575,814 B1 * | 6/2003 | Ayyagari et al. | 451/35 |
| 6,599,176 B2 | 7/2003 | Hoffman | |
| 6,612,907 B2 * | 9/2003 | Ayyagari et al. | 451/35 |
| 6,688,952 B2 * | 2/2004 | Bagdasarian | 451/326 |
| 2002/0078813 A1 | 6/2002 | Hoffman | |
| 2003/0060136 A1 | 3/2003 | Hoffman | |
| 2003/0092367 A1 | 5/2003 | Hoffman | |
| 2003/0094077 A1 | 5/2003 | Hoffman | |

FOREIGN PATENT DOCUMENTS

DE      4429      6/1879

* cited by examiner

*Primary Examiner*—M. Rachuba
(74) *Attorney, Agent, or Firm*—Drinker Biddle & Reath LLP

(57) ABSTRACT

A method for forming a tool having a smooth surface finish is disclosed. The method involves the step of first rotating a plurality of tools within an inner vessel at high speed relative to the outer vessel with a first abrasive. The first abrasive is then removed and a second abrasive is added to the vessel. The inner vessel is then rotated, again at high speed, with the second abrasive. The resulting tools have reduced surface anomalies.

22 Claims, 9 Drawing Sheets

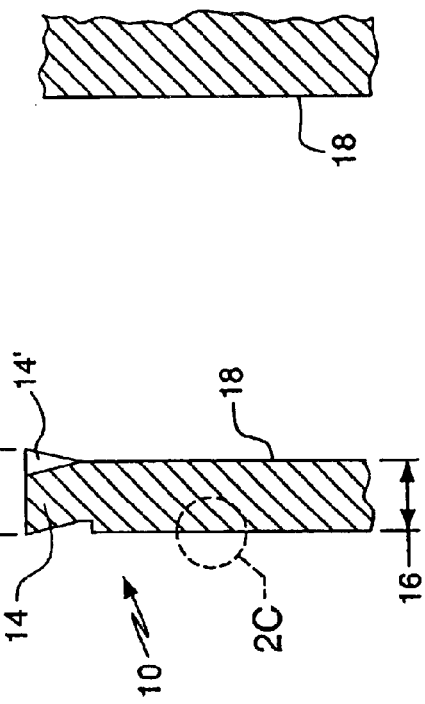
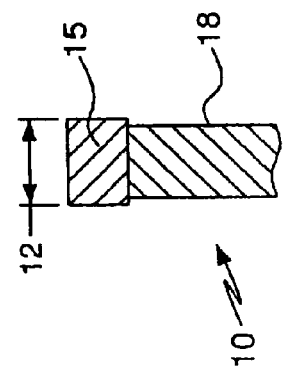
FIG. 2C
FIG. 2A
FIG. 2B
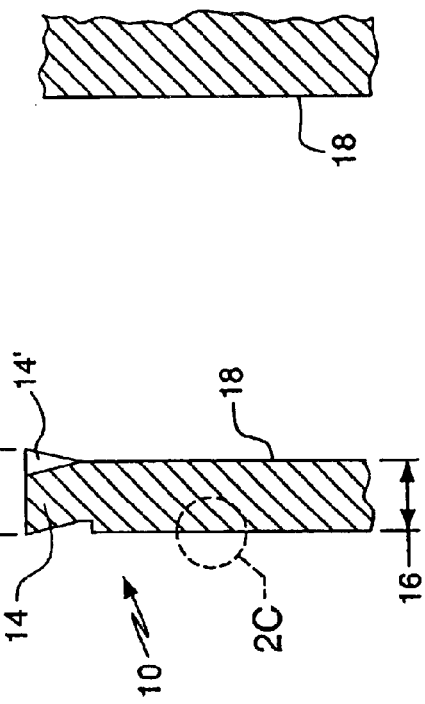
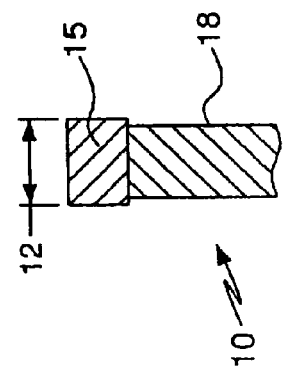
FIG. 1C
FIG. 1A
FIG. 1B

METHOD OF MANUFACTURING A TOOL USING A ROTATIONAL PROCESSING APPARATUS

RELATED APPLICATIONS

This application is a continuation-in-part of pending U.S. patent application Ser. No. 09/965,162, filed Sep. 27, 2001 entitled "Saw Blade," and PCT Application Ser. No. PCT/US02/03272, filed Feb. 5, 2002 entitled "Improved Tool and Method of Making," the disclosures of both applications are incorporated herein by reference in their entirety.

FIELD OF THE INVENTION

The present invention relates to tools and, more particularly, to a method of manufacturing an improved saw blade using a rotational processing apparatus.

BACKGROUND

The are many factors which impact on the efficiency of a manufacturing cutting process, such as cutting tool life, operator fatigue, and inaccuracy in cutting. These factors limit how quickly and easily parts can be manufactured.

Cutting tool wear results from repeated contact between the cutting tool and the workpiece and directly correlates with the life of the product. The contact between the workpiece and the cutting tool also produces friction which, in turn, generates heat that can adversely affect the life of the tool. For example, as a saw blade cuts through a workpiece, the sides of the blade contact the sides of the groove that has been cut into the workpiece. The sides of conventional saw blades have a relatively rough finish. As such, when the abrasive surface of the saw blade contacts the abrasive surface of the cut groove, a large degree of friction results which quickly heats up the workpiece and the saw blade. Excessive heat can result in damage to the saw blade and/or the workpiece.

Operator fatigue also reduces production efficiency. Operator fatigue is generally magnified by the frictional resistance between the cutting tool and the workpiece. As discussed above, when the sides of a saw blade contact the workpiece, friction develops between the two rough surfaces. This frictional interaction is transmitted directly to the operator as cutting resistance requiring the operator to apply more force to cut the part.

In order to minimize contact between the blade and the workpiece, conventional saw blades are formed such that the width of the cut (commonly referred to as the saw set), which is defined by either the width of the cutting tip for straight saw blades or the overall width formed by the laterally offset teeth in non-straight saw blades, is slightly oversized from the blade or body of the saw blade. This oversize in the cut provides clearance between the blade and the cut portions of the workpiece. The amount of clearance will vary depending on the size and type of saw blade. While adding clearance between the saw blade and the cut portion of the workpiece helps reduce the contact between the saw blade and the workpiece, any lateral movement of the saw blade will still result in the tool contacting the workpiece.

Another problem with conventional saw blades actually results from the clearance that is introduced between the width of the teeth and the blade or plate to alleviate the frictional contact discussed above. The clearance between the teeth and the blade can produce wobble of the saw blade as it cuts through the workpiece. This can result in misdirection of the saw blade, producing an inaccurate cut. Most manufactures of saw blades, however, feel that this is an acceptable deficiency in conventional saw blades since reducing operator fatigue and extending tool life are paramount.

Recently companies have begun to brand their tool products based on the appearance of the product. For example, many companies have begun to apply a consistent coloring or finishing scheme to their products so that consumers quickly identify the product as belonging to a particular manufacturer. These coloring schemes have an additional benefit—to assist in hiding blemishes and other non-critical discrepancies in the product finish.

For products that are not coated or painted, the blemishes must be removed by surface grinding the part. This adds unnecessary cost to the resulting product.

A need, therefore, exists for an improved manufacturing process which provides a surface finished tool that has reduced visible blemishes and which has a shiny finish.

SUMMARY OF THE INVENTION

A method for forming a tool having a smooth surface finish is disclosed. The method involves the step of adding a first abrasive to a vessel. The vessel is located within a outer vessel and contains a plurality of tools. The inner vessel is rotated at high speed relative to the outer vessel. The rotation causes the first abrasive to contact the surface of the tools. After the first rotational stage is complete, the first abrasive is removed and a second abrasive is added to the vessel. The inner vessel is then rotated, again at high speed, with the second abrasive. At the completion of the second rotational stage, the finished tools are removed from the inner vessel.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1A illustrates a partial cross-sectional view of a conventional saw blade with offset teeth.

FIG. 1B illustrates a partial cross-sectional view of a conventional saw blade with a cutting tip.

FIG. 1C is a schematic representation of an enlarged detail of the surface of the conventional saw blade of FIG. 1A.

FIG. 2A illustrates a partial cross-sectional view of a cutting blade with offset teeth made according to the present invention.

FIG. 2B illustrates a partial cross-sectional view of a cutting blade with a cutting tip made according to the present invention.

FIG. 2C is a schematic representation of an enlarged detail of the surface of the saw blade shown of FIG. 2A made in accordance with the present invention.

DETAILED DESCRIPTION OF THE PREFERRED EMBODIMENTS

Figure 3:
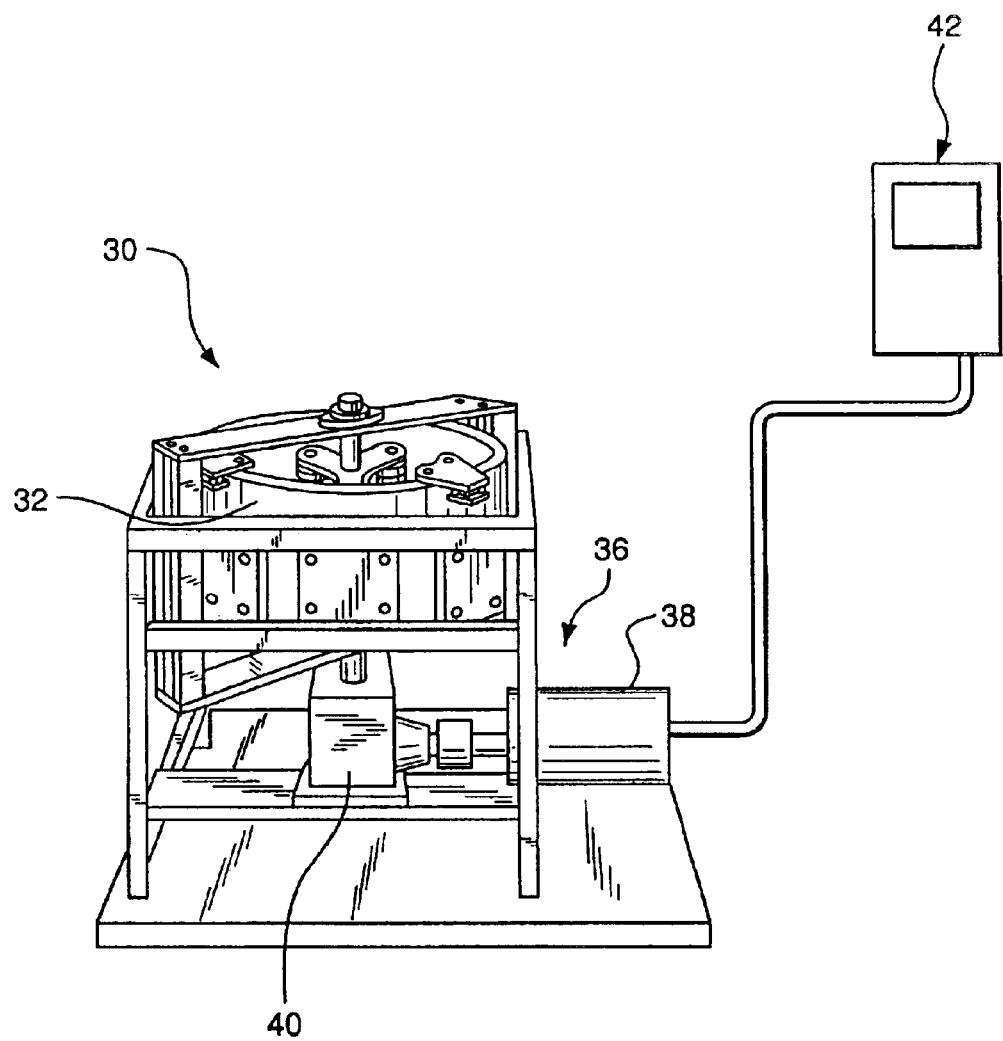
FIG. 3 is a is a perspective view showing one embodiment of a high speed centrifugal finishing apparatus for use in forming the surface finish on the saw blade according to the present invention.
Figure 4:
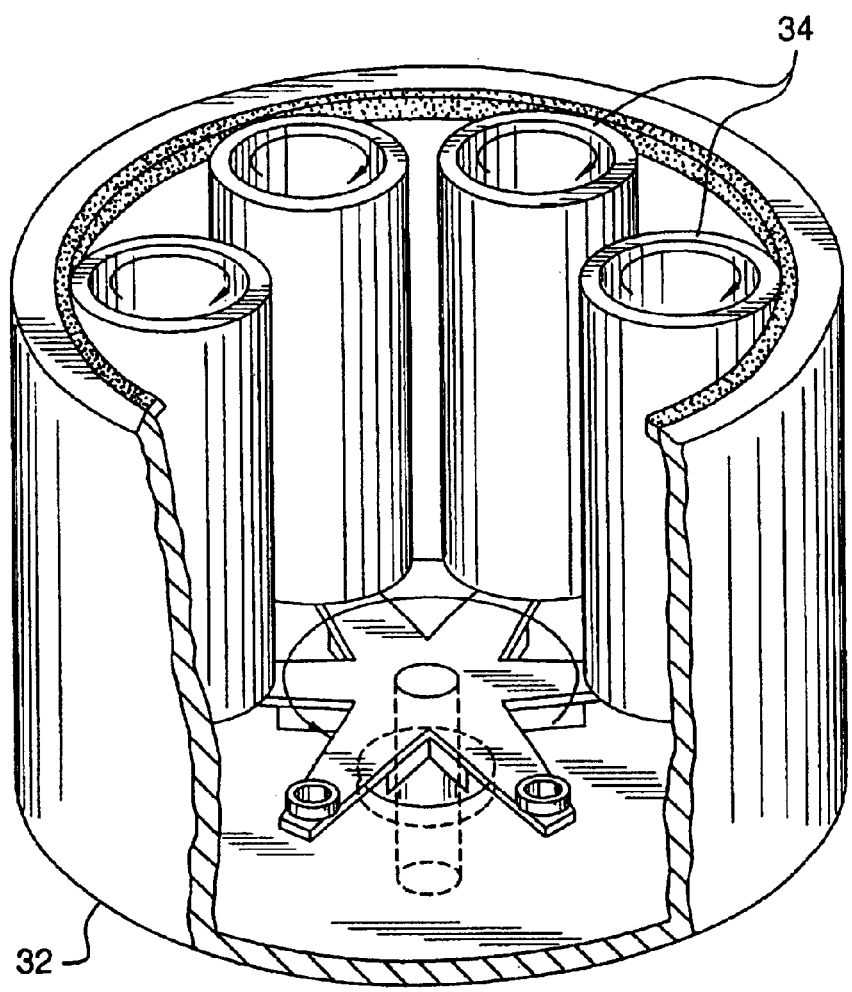
FIG. 4 is a perspective view of a portion of the high speed centrifugal finishing apparatus of FIG. 3 showing the inner vessels mounted within the outer vessel.
Figure 5:
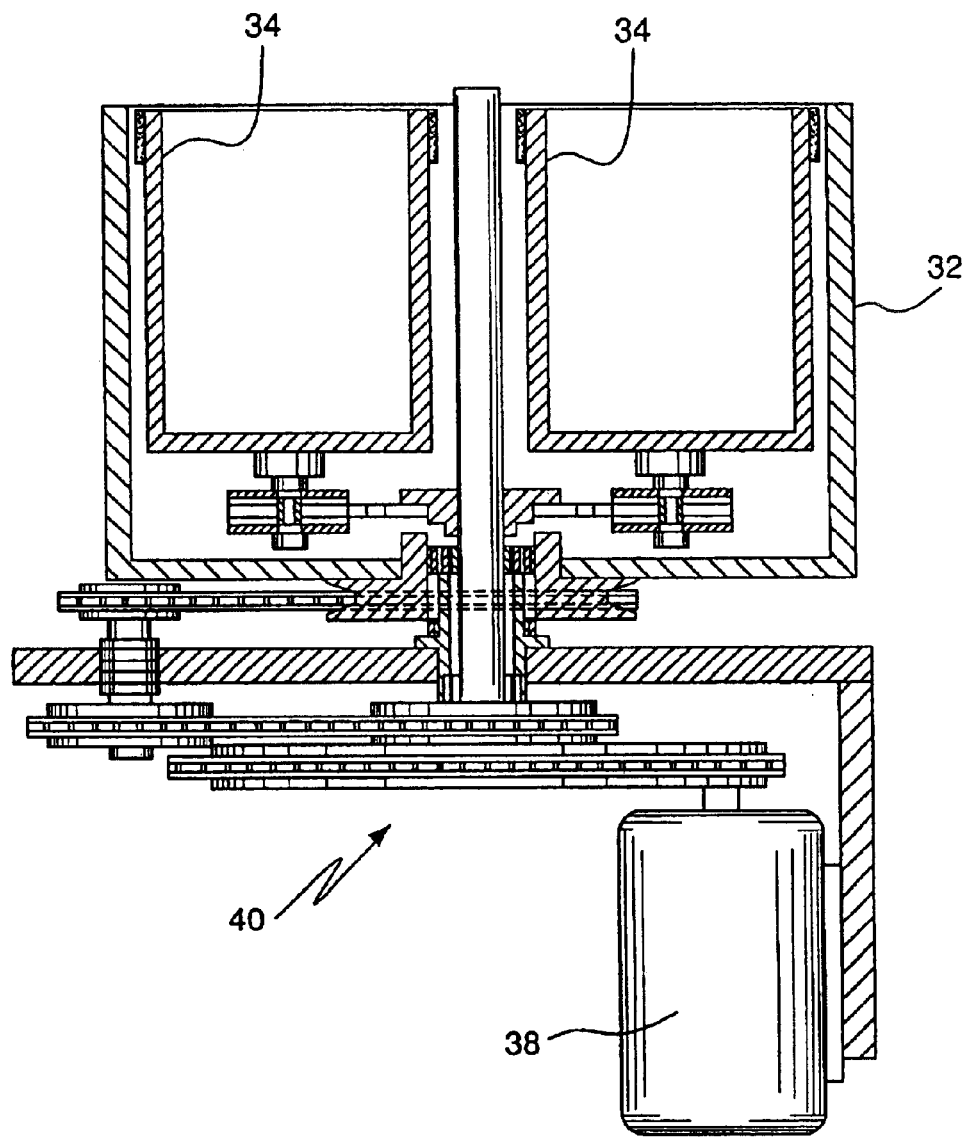
FIG. 5 is a cross-sectional view of a portion of a high speed finishing apparatus.

For the purpose of illustrating the invention, there is shown in the drawings one or more embodiments of the invention which are presently preferred; it being understood, however, that this invention is not limited to the precise arrangements and instrumentalities shown.

FIG. 1A illustrates a partial cross-sectional view of a conventional saw blade. As discussed above, a conventional saw blade includes a cutting tip width W which defines the spacing or clearance that will result between the cut formed in the workpiece and the blade. The cutting tip width W is defined by either the overall width of the offset teeth (called spring-setting and shown in FIG. 1A), or the actual width of the straight cutting tip T (called swage-setting and shown in FIG. 1B). A schematic representation of an enlarged detailed view of the side of the saw blade is shown in FIG. 1A, illustrating a conventional brushed steel finish F formed on the blade portion of the saw blade. A brushed steel finish is generally very rough.

Figure 7:
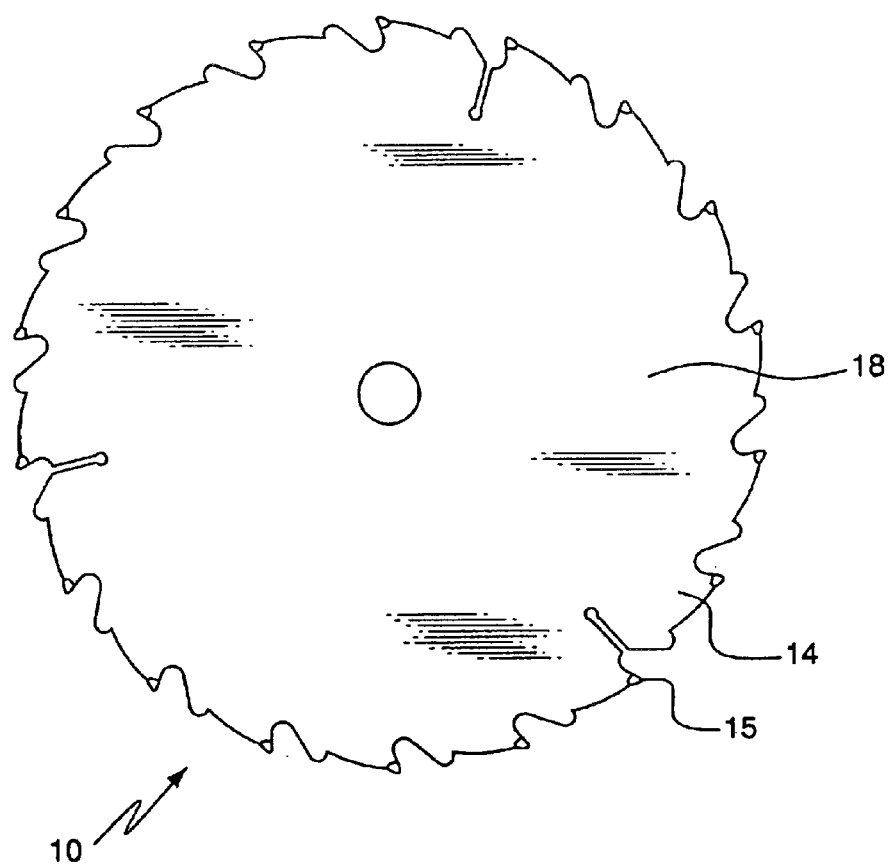
FIG. 7 is a plan view of a saw blade made in accordance with the present invention.

Referring now to FIGS. 2 and 7, a saw blade 10 according to the present invention is shown. It should be recognized that the present invention is applicable for handsaws, hacksaws and circular saw blades, and the like. The saw blade 10 includes a cutting tip width 12 that is defined by either the overall width of the laterally offset teeth 14, 14' on non-straight saw blades (shown in FIG. 2A), or the actual width of the cutting tips 15 on straight saw blades (shown in FIG. 2B). As will become more apparent below, the cutting tip width 12 in a saw blade made according to the present invention need not be larger than the width 16 of the blade 18.

FIG. 2C is an enlarged schematic representation of a blade 18 of the saw blade 10. The enlarged drawing illustrates the smooth surface that is formed on the blade 18 of the present invention. In particular the blade 18 side surfaces have a high precision polished or finished surface of less than 10 Ra. In one embodiment, the blade 18 has a finished surface of approximately 6 Ra or less. A more preferred surface finish is between approximately 2 Ra and 4 Ra. This finish results in the blade portion 18 of the saw blade 10 having a low coefficient of friction when in contact with the workpiece. As a result, the smooth surface acts as a lubricant which permits the blade 18 to slide virtually uninhibited along the cut surface of the workpiece. In contrast, a conventional saw blade has a surface finish of approximately 45 Ra to 50 Ra.

By providing this low frictional surface on the saw blade 10, the cutting tip width 12 on the saw blade 10 does not have to be significantly wider than the width 16 of the blade 18, i.e., the cutting tip width 12 can be substantially the same as the width 16 of the blade 18. Because of the low frictional surface finish, the sides of the blade 18 operate as guides which assist in channeling or directing the saw blade 10, and thus the cutting teeth 14 or tips 15, in a straight line. This results in a more precise cut. In contrast, the width of cutting tip on a conventional blade must be significantly larger than the width of the blade body so that the blade does not bind during use.

The smooth finish also addresses the problem of workpiece expansion. When wood or plastic is cut, there is a tendency for the material to expand (i.e., the cut sides to move toward one another.) This can result in the saw blade freezing in the workpiece. Prior art saw blades addressed this problem by forming the blade portion of the saw blade thinner than the teeth in an attempt to prevent the sides from contacting the workpiece. The smooth surface of the present invention, however, eliminates any concern for the expansion of the workpiece since the low friction surface acts like a lubricated surface, allowing the saw blade to freely cut through the workpiece.

Another benefit of the present invention is the ability to reduce the width of the cutting tip 15 in a straight blade. Many metal-cutting industrial blades are made with expensive tips, such as carbide tips. As noted above, since the blade 18 can now have a blade width 16 substantially the same as the cutting tip width 12, the cutting tips 15 can actually be formed smaller in width than on conventional saw blades. Reducing the width of the tip 15 results in a substantial savings over conventional blades (e.g., less carbide).

It is not uncommon for saw blades, prior to finishing, to have blemishes, slight dents and other cosmetic deficiencies. For example, after punching of the blades, the saw blades are sometimes placed into an acid wash to assist in cleaning. However, acid washes tend to create carbon zones on the surface of the blade. Also, oxidate scale, hard spots and martensite zones can sometimes develop on the blade during the formation process. In a conventional blade manufacturing process these discrepancies must be removed through a grinding process prior to or after heat treating. Alternately, the blade may be painted after heat treating to cover these blemishes.

The use of the inventive process described above and in co-pending U.S. patent application Ser. No. 09/965,162 particularly highlights some of these blemishes since the blade is made highly shiny, thus emphasizing the existence of even small blemishes.

In order to address this issue, a novel method for processing tools, such as saw blades has been developed. The process involves a two stage processing operation using a high energy rotational processor, such as those disclosed in co-pending application Ser. No. 10/326,674, entitled "Horizontal Finishing Machine," which is incorporated herein by reference in its entirety. Other types of rotational processors may be used in the present process without detracting from the scope of the present invention. The process involves first placing the products to be finished into a rotational processing container with a first stage media. The first stage media is selected to provide a desired degree of material removal. For example, for processing conventional saw blades, the first stage media is selected so as to preferably include a high strength abrasive, such as silicon carbide. Other types of materials and products would use other types of first stage media. The rotational processor is then operated for a prescribed period of time. The amount of time and speed of first stage operation will depend on various parameters, such as the amount of blemishes and surface damage that exists on the product, the first stage media used, etc. This first stage operation is designed to remove carbon deposits, blend out hard spots and, to the extent it is performed after heat treating, remove discoloring from heat treatment.

Since the first stage of the present invention involves rapid material removal, it is beneficial to use a rotational processor that operates so as to generate high g-forces and speeds.

When the first stage is complete, the products being finished are removed from the first stage media or the first stage media is removed from the containers. The latter method can be performed by mounting the products being finished to the rotational processing container, such as by removably locking a fixture to the container wall. The container could then easily be inverted emptying the first stage media into a collection container from which is could be reused, recharged or disposed of.

A second stage media is then introduced into the container with the products being finished. The second stage media is selected to as to provide polishing or lapping of the surface of the products. Preferably the second stage media is selected so as to include an abrasive that is softer than the first stage media. The second stage of the process is then run with the second stage media until the product achieves the desired finish.

In one embodiment of the present invention used on circular saw blades, the first stage media included silicon carbide abrasive. The first stage operation was run on one of the rotational processing machines described in U.S. patent application Ser. No. 10/326,674, entitled "Horizontal Finishing Machine." The first stage was run at approximately 175 RPM for approximately 30–60 minutes. The configuration of the machine results in the container itself rotating at approximately 295 RPM. The time involved in the first can vary depending on the initial condition of the saw blade, e.g., pickled, oxidized, etc. This initial speed generates approximately 16 g's on the media and saw blade. The first stage is designed to provide rapid removal of material from the saw blade surface.

The saw blades were removed from the rotational processing container, heat treated and then sharpened. The blades were then placed back into the rotational processing container with the second stage abrasive. The second stage abrasive included aluminum oxide abrasive. The second stage operation was again run on the same rotational processing machine at approximately 120 RPM for approximately 60 minutes. More preferably, the second stage is run at two different speeds. First it is run at 175 RPM for about 30 minutes, which subjects the saw blades to approximately 16 g's. The speed of the machine is then reduced to approximately 120 RPM (producing rotation of the barrel at approximately 200 RPM) for about 30 minutes. This speed subjects the saw blades to approximately 7 g's.

The process described above produces blades that have a very shiny finish with virtually no detectable blemishes. The forces also produce cold plastic deformation of the surface which results in greater lubricity, reduced residual stresses and improved material characteristics. Thus, the saw blade is structurally changed for its initial condition.

Also, the use of a two stage process allows for different speeds and g-forces to be applied to the part being processed, as well as the use of different media combinations. If a single stage process were used, the media that would be needed would necessitate reduced speeds during the initial phase, thus extending the processing time.

In another embodiment, the processing machine is operated at higher speeds generating forces on the products in the containers of up to approximately 40 g's. In this embodiment, the first stage again uses silicon carbide media. The machine is operated at approximately 235 RPM which causes the container to rotate at approximately 400 RPM. This results in the saw blades experiencing approximately 40 g's of acceleration. The process is run for about 15 minutes, again depending on the initial condition of the saw blade.

In the second stage, aluminum oxide is used as the preferred media. The machine is again run for approximately 15 minutes at about 235 RPM which causes the container to rotate at approximately 400 RPM and produces approximately 40 g's of acceleration in the container. The speed is then reduced to approximately 120 RPM (producing rotation of the barrel at approximately 200 RPM) for about 30 minutes. This speed subjects the saw blades to approximately 7 g's.

It should be readily apparent that the speeds and times above are just exemplary of two embodiments. The speeds and times used in the process will depend on various considerations, such as the condition of the media (worn media may require additional processing time), the configuration of the machine (larger diameter on outer vessel permits use of slower speeds while still maintaining or increasing the speed of the media relative to the part), and the condition of the parts being finished. Also, while the above process has been described as being used to finish saw blades, it is also applicable to other products, particularly cutting tools, that can benefit from surface finishing which includes plastic deformation.

The process described above yields additional benefits which help extend the life of the saw blade. For example, the process results in the saw blade surface being resistant to rust. This occurs because the high speed finishing process produces an occlusion free surface which prevents rust from generating. As such, the need to rust proof coat or paint the saw blade for protective purposes is reduced or completely eliminated using the present invention.

The saw blade 10 according to the present invention also produces a more accurate and smooth cut since the blade 18 helps guide the saw blade and cutting tips. The smooth surface of the blade 18 acts like a lubricated surface, reducing the friction developed between the saw blade 10 and the workpiece. This results in reduced energy requirements, while at the same time providing for more efficient cutting action. The smooth surface also reduces the noise that is generated with conventional saw blades when they contact the workpiece.

As discussed above, the present invention permits the tip or teeth to have essentially the same width as the blade 18. While reducing the tip 15 width is one way to achieve this, it is also contemplated that the blade 18 can be widened to be essentially the same thickness as the tip 15 or teeth 14. The wider blade 18, would be more structurally stable than its conventional counterparts. The added structural stability also permits the saw blade 10 to be formed without the need for heat treating. Accordingly, the resulting saw blade is less expensive to manufacture. Also, thicker saw blades are more resistant to vibrations, which can lead to operator fatigue.

It has also been determined through testing that the precision polishing of the saw blade reduces and/or eliminates embrittlement in the blade. During a normal heat treating process, microscopic fractures form within the steel blade. These eventually become the source of blade failure by cracking. The high speed precision polishing process used in the present invention produces a universal stressing of the surface of the metal, similar to shot peening a part. This results in a structurally different blade. Conventional shot peening could not be used on such blades because of the resulting damage that would occur to the teeth and the uneven change in surface characteristics (i.e., non-planar) that would result. The precision finishing process of the present invention provides enhanced material characteristics previously unseen in saw blades.

Also, testing has shown that use of the finishing operations described above on a saw blade produces a blade with reduced residual stress. During the process of forming the saw blade from stock material, stresses develop within the metal, especially at or around the teeth. Residual stresses in the blade generally result in premature warpage of the blade and can lead to the development of fractures, ultimately resulting in blade failure. Testing has shown that the processing of the blade produces a universal stressing of the surface of the metal, thus significantly reducing the residual stress in the blade. This results in a radically different product which is much flatter and less prone to warpage and fracture.

Additionally, upon testing and inspection it was noted that the present invention results in a product with reduced surface inclusions. Surface inclusions are disadvantageous in cutting materials since they provide areas for acid to attach and degrade the material. During manufacture, cutting tools are, in many circumstances, exposed to acid washes. Also, during use of the cutting tool, acid can result from the materials being cutting and/or from exposure to certain surrounding environments. For example, it is quite common for wood pulp to produce acid during a cutting operation. Surface inclusions provide locations for acid to become trapped and, subsequently, attack the underlying material.

The finished surface on a cutting tool according to the present invention has substantially reduced surface inclusions. Thus, the tool has significantly greater resistance to acid attack. This is even more important in saw blades where the blade is typically made from tungsten carbide. Acid tends to cause the cobalt to leech out of the tungsten carbide, thereby weakening the blade considerably. The present invention provides a saw blade that is stronger and less likely to suffer degradation due to acid attack. The process is not limited to materials which suffer from acidity. The process can also be used on materials which degrade from oxidation or rust, such as from chlorine or water. By minimizing surface inclusions, the present invention inhibits such contaminants from sitting on the surface of a product and eating away at the underlying material.

Figure 8:
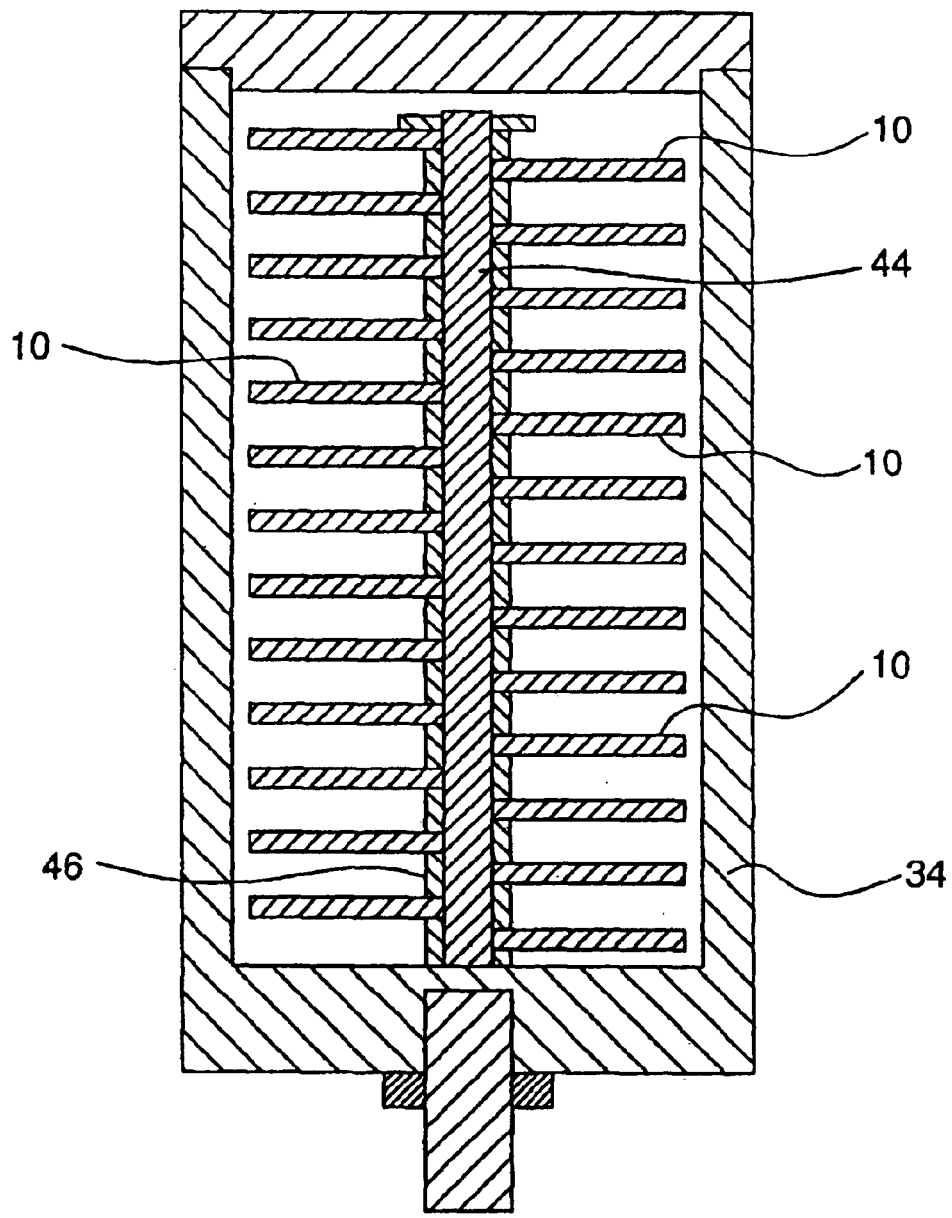
FIGS. 8–10 illustrate alternate embodiments of a fixture according to the present invention.
Figure 9:
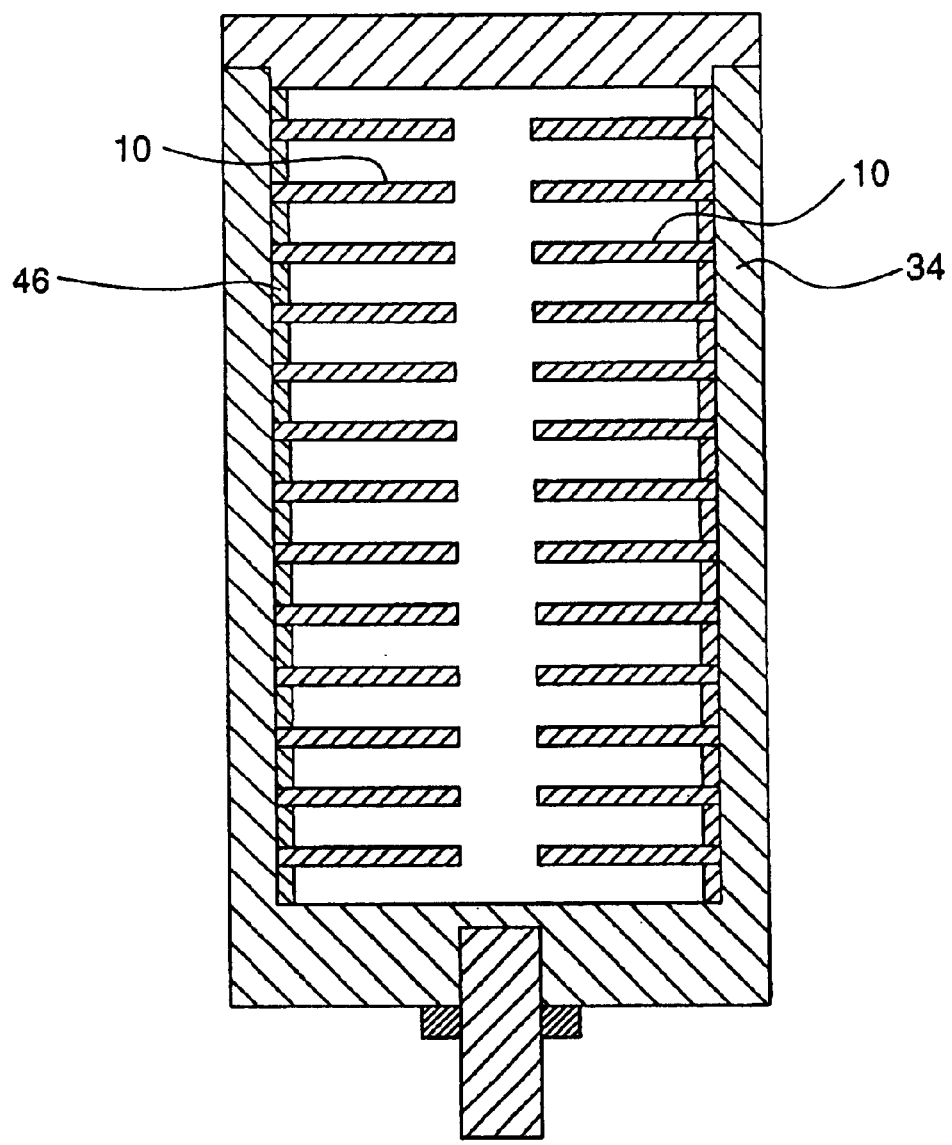

While the above discussion has been directed to a saw blade embodiment, it is also contemplated that the present invention can be used with other saw-type cutting tools, such as hacksaws, handsaws, bandsaws and the like. Furthermore, the high speed processed finish can provide the same benefits on other types of cutting tools, such as drill bits, as well as other materials subject to residual stress and acid damage, such as tungsten carbide tools bits. Also, while the invention described above used a fixture for holding multiple saw blades in the high speed centrifugal finisher, a similar fixture could be used to hold tools, such as drill bits. FIG. 8 illustrates one such example for holding a plurality of parts being finished. It is also contemplated that the parts could be mounted so as to face inward, thus using the centrifugal force to assist in holding the part on the fixture. FIG. 9 illustrates such an embodiment.

Figure 6:
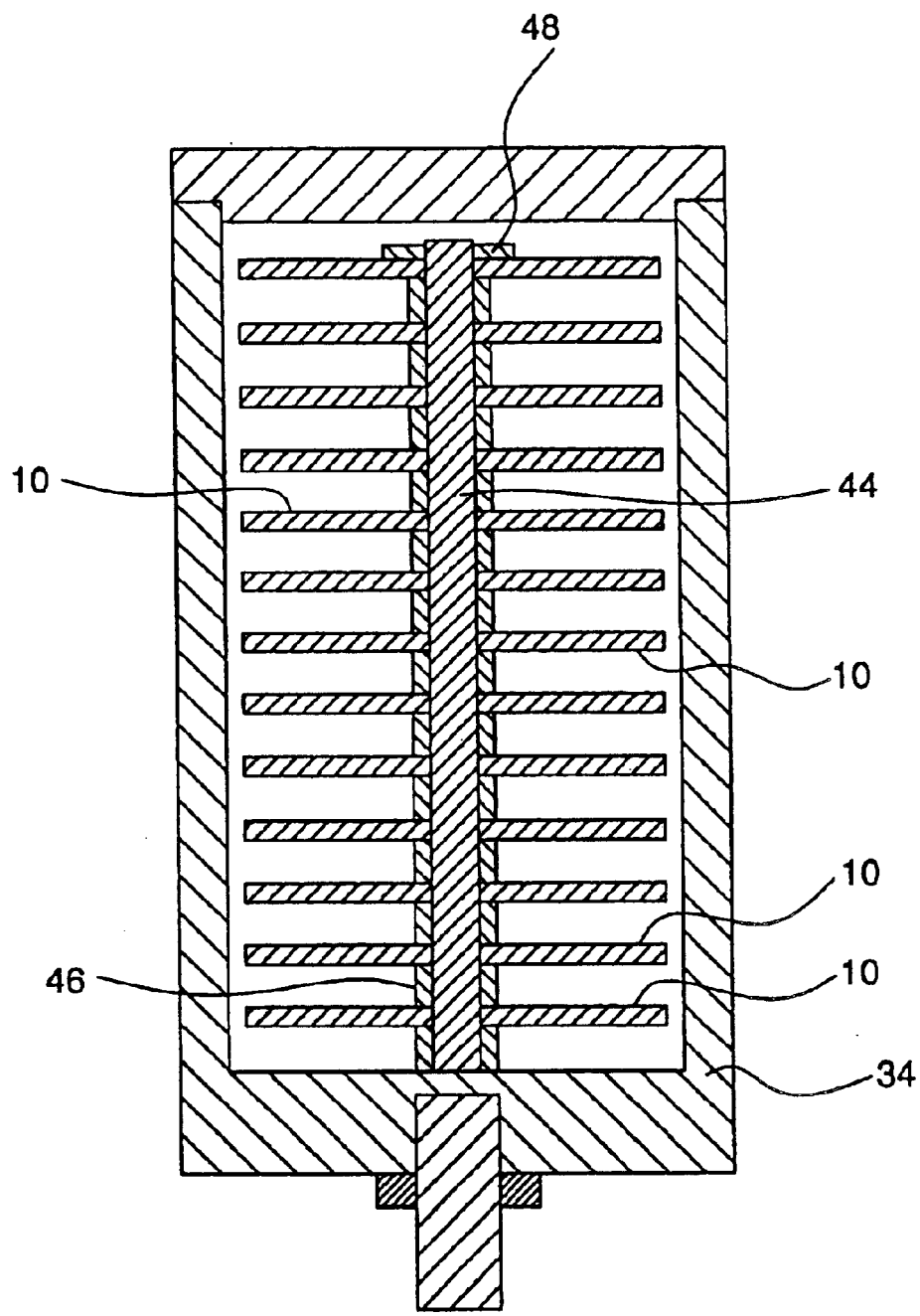
FIG. 6 is a cross-sectional of one embodiment of an inner vessel with the saw blades mounted within it.
Figure 10:
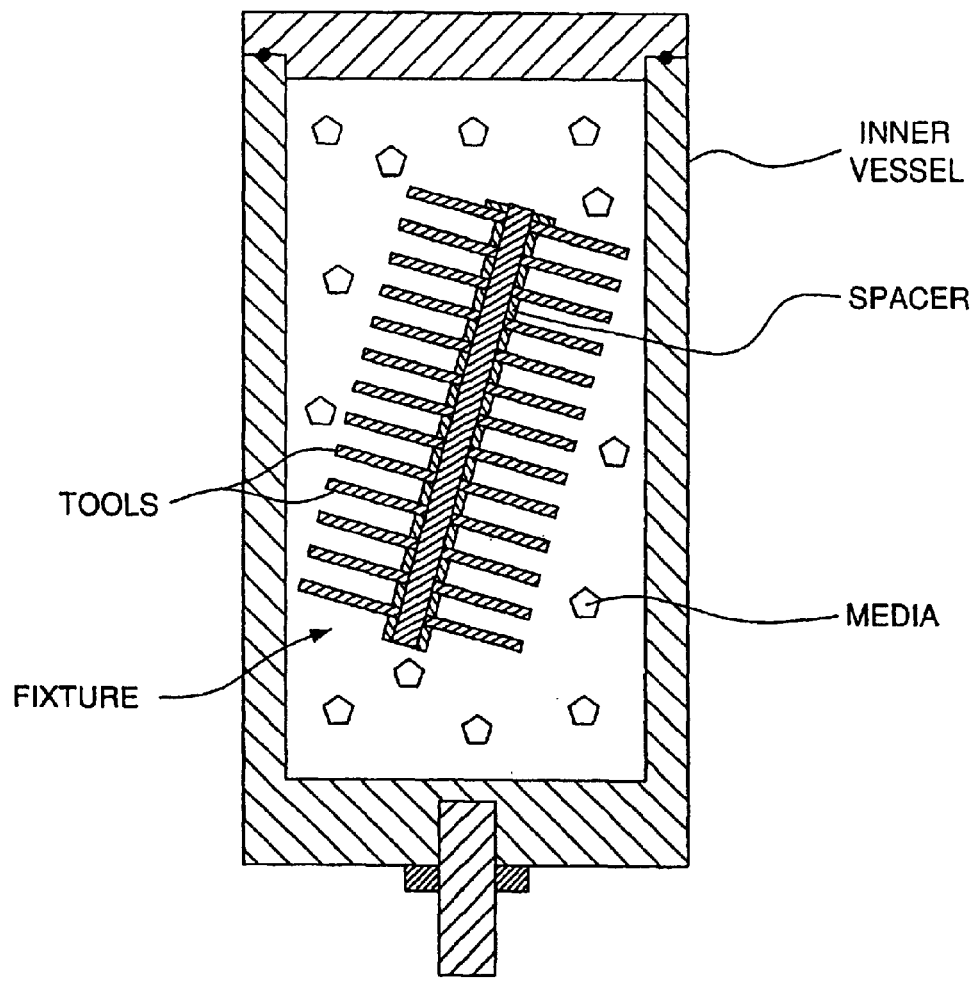

While the embodiments illustrated in FIGS. 6, 8 and 9 show a fixture that appears fixed to the inner vessel, it is also contemplated that the fixture be free to move about the vessel during operation. It has been determined that additional finishing of the products can be achieved is the products being finished are attached to a fixture that is free to float within the vessel. More particularly, referring to FIG. 10, an embodiment of the present invention is shown where the fixture which holds the tools being finished is free to tumble within the vessel. Since the fixture will have a greater inertial resistance than the finishing media (i.e., its' relative velocity is slower than the media), the media will not only contact the tools by cascading into it (mimicking the effect of shot peening), but will also slide along the various faces of the tool (mimicking the effect of polishing or lapping). Accordingly, a tool finished using the present invention will have a markedly better finish than a conventionally finished tool.

The present invention can be used on various materials, such as metals, plastics and ceramics. Furthermore, the present invention has applicability to linear shafts and bearings/bushings as well. In such embodiments, the process will provide a harder and smoother surface than conventional finishing operations.

The process can be controlled in a variety of ways to achieve a host of different finishes. For example, the speed of operation of the finishing apparatus, the type and size of the media and the agitation rate may be controlled in order to determine the inertial velocity, i.e., how much energy is imparted to the product during the finishing operation. This assists in determining the cold plastic deformation that will be imparted to the product.

The above benefits are clearly unexpected and contrary to conventional tool design and manufacturing practices.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A method for forming tools having a smooth surface finish comprising the steps of:

providing a high speed rotational processing apparatus having an outer vessel and at least one inner vessel;

mounting the plurality of tools to a fixture so that each tool is spaced from an adjacent tool;

placing the fixture into the inner vessel;

adding a first abrasive media into the inner vessel;

rotating the inner vessel in a first stage at high speed relative to the outer vessel such that the inner vessel rotates about its axis of rotation and about the axis of rotation of the outer vessel, the high speed rotation causing the first abrasive media to repeatedly contact the surface of the tools, the contact producing material removal of the surface of the tools;

removing the first abrasive media from the inner vessel;

adding a second abrasive media into the inner vessel;

rotating the inner vessel the vessel in a second stage at high speed relative to the outer vessel such that the inner vessel rotates about its axis of rotation and about the axis of rotation of the outer vessel, the high speed rotation causing the second abrasive media to repeatedly contact the surface of the tools, the contact producing polishing of the surface of the tools; and removing the tools from the inner vessel;

wherein the step of rotating the inner vessel in the first stage involving rotating the inner vessel at a first stage speed and for a first period of time, and wherein the step of rotating the inner vessel in the second state involving rotating the inner vessel at an initial second stage speed for an initial second period of time, and then reducing the speed to a second stage speed and substantially holding the speed at that second speed for a second period of time of at least several minutes.

2. A method according to claim 1 wherein the step of placing the fixture into the vessel involves mounting the fixture to the vessel wall.

3. A method according to claim 1 wherein the reduced second stage speed is less than the first stage speed for at least part of the second period of time.

4. A method according to claim 3 wherein the initial second stage speed is approximately the same speed as the first stage speed and then is reduced to a speed that is less than the first stage speed.

5. A method according to claim 3 wherein the inner vessel in the first stage rotates at a speed above approximately 100 RPM and, wherein the initial speed of the inner vessel in the second stage is above 100 RPM.

6. A method for forming tools having a smooth surface finish comprising the steps of:

providing a high speed rotational processing apparatus having an outer vessel and at least one inner vessel;

placing a plurality of tools into the inner vessel, each tool being spaced apart from an adjacent tool;

adding a first abrasive media into the inner vessel;

rotating the inner vessel in a first stage at high speed relative to the outer vessel such that the inner vessel rotates about its axis of rotation and about the axis of rotation of the outer vessel, the high speed rotation causing the first abrasive media to repeatedly contact the surface of the tools, the contact producing material removal of the surface of the tools;

removing the first abrasive media from the inner vessel;

adding a second abrasive media into the inner vessel;

rotating the inner vessel the vessel in a second stage at high speed relative to the outer vessel such that the inner vessel rotates about its axis of rotation and about the axis of rotation of the outer vessel, the high speed rotation causing the second abrasive media to repeatedly contact the surface of the tools, the contact producing polishing of the surface of the tools; and removing the tools from the inner vessel;

wherein the step of placing a plurality of tools into the inner vessel involves mounting the plurality of tools to a fixture so that each tool is spaced from an adjacent tool, and placing the fixture into the vessel;

wherein the step of rotating the inner vessel in the first stage involving rotating the inner vessel at a first stage speed and for a first period of time, and wherein the step of rotating the inner vessel in the second stage involving rotating the inner vessel at a second stage speed and for a second period of time;

wherein the inner vessel in the first state rotates at a speed above approximately 100 RPM and the inner vessel in the second stage rotates at two speeds, at least one of which is above 100 RPM; and wherein the inner vessel in the first stage rotates at a speed of approximately 295 RPM, and wherein the inner vessel in the second stage rotates at a speed of approximately 295 RPM for a part of the second period of time and at a speed of approximately 200 RPM for another part of the second period of time.

7. A method for forming tools having a smooth surface finish comprising the steps of:

providing a high speed rotational processing apparatus having an outer vessel and at least one inner vessel;

placing a plurality of tools into the inner vessel, each tool being spaced apart from an adjacent tool;

adding a first abrasive media into the inner vessel;

rotating the inner vessel in a first stage at high speed relative to the outer vessel such that the inner vessel rotates about its axis of rotation and about the axis of rotation of the outer vessel, the high speed rotation causing the first abrasive media to repeatedly contact the surface of the tools, the contact producing material removal of the surface of the tools;

removing the first abrasive media from the inner vessel;

adding a second abrasive media into the inner vessel;

rotating the inner vessel the vessel in a second stage at high speed relative to the outer vessel such that the inner vessel rotates about its axis of rotation and about the axis of rotation of the outer vessel, the high speed rotation causing the second abrasive media to repeatedly contact the surface of the tools, the contact producing polishing of the surface of the tools; and removing the tools from the inner vessel;

wherein the step of placing a plurality of tools into the inner vessel involves mounting the plurality of tools to a fixture so that each tool is spaced from an adjacent tool, and placing the fixture into the vessel;

wherein the step of rotating the inner vessel in the first stage involving rotating the inner vessel at a first stage speed and for a first period of time, and wherein the step of rotating the inner vessel in the second state involving rotating the inner vessel at a second stage speed and for a second period of time;

wherein the inner vessel in the first stage rotates at a speed above approximately 100 RPM and the inner vessel in the second stage rotates at two speeds, at least one of which is above 100 RPM; and wherein the inner vessel in the first stage rotates at a speed of above approximately 250 RPM for at least approximately 15 minutes, and wherein the inner vessel in the second stage rotates at a speed above approximately 250 RPM for at least approximately 15 minutes, then at a speed below 250 RPM for at least approximately 15 minutes, and wherein the media in the first stage includes silicon carbide and the media in the second stage includes aluminum oxide.

8. A method for forming tools having a smooth surface finish comprising the steps of:

providing a high speed rotational processing apparatus having an outer vessel and at least one inner vessel;

placing a plurality of tools into the inner vessel, each tool being spaced apart from an adjacent tool so as not to touch during rotation;

adding a first abrasive media into the inner vessel;

rotating the inner vessel in a first stage at a first rotational speed relative to the outer vessel such that the inner vessel rotates about its axis of rotation and about the axis of rotation of the outer vessel, the rotation causing the first abrasive media to repeatedly contact the surface of the tools, the contact producing material removal of the surface of the tools;

removing the first abrasive media from the inner vessel;

adding a second abrasive media into the inner vessel, the second abrasive media being different from the first abrasive media;

rotating the inner vessel the vessel in a second stage at an initial speed relative to the outer vessel such that the inner vessel rotates about its axis of rotation and about the axis of rotation of the outer vessel for a initial period of time:

slowing the rotation of the inner vessel in the second stage to a second speed and rotating the inner vessel at approximately that speed for a second period of time, the second speed being less than the initial speed and the speed of rotation during the first stage, and wherein the second period of time is for at least several minutes; and removing the tools from the inner vessel.

9. A method according to claim 8 wherein the step of placing a plurality of tools into the inner vessel involves mounting the plurality of tools to a fixture so that each tool is spaced from an adjacent tool, and placing the fixture into the vessel.

10. A method according to claim 9 wherein the inner vessel in the first stage rotates at a speed above approximately 100 RPM, and wherein the initial speed of the inner vessel in the second stage rotates above 100 RPM.

11. A method for forming tools having a smooth surface finish comprising the steps of:

providing a high speed rotational processing apparatus having an outer vessel and at least one inner vessel;

placing a plurality of tools into the inner vessel, each tool being spaced apart from an adjacent tool so as not to touch during rotation;

adding a first abrasive media into the inner vessel;

rotating the inner vessel in a first stage at a first rotational speed relative to the outer vessel such that the inner vessel rotates about its axis of rotation and about the axis of rotation of the outer vessel, the rotation causing the first abrasive media to repeatedly contact the surface of the tools, the contact producing material removal of the surface of the tools;

removing the first abrasive media from the inner vessel;

adding a second abrasive media into the inner vessel, the second abrasive media being different from the first abrasive media;

rotating the inner vessel the vessel in a second stage at an initial speed relative to the outer vessel such that the inner vessel rotates about its axis of rotation and about the axis of rotation of the outer vessel for a initial period of time;

slowing the rotation of the inner vessel in the second stage to a second speed and rotating the inner vessel at that speed for a second period of time, the second speed being less than the initial speed and the speed of rotation during the first stage; and removing the tools from the inner vessel;

wherein the step of placing a plurality of tools into the inner vessel involves mounting the plurality of tools to a fixture so that each tool is spaced from an adjacent tool, and placing the fixture into the vessel;

wherein the inner vessel in the first stage rotates at a speed above approximately 100 RPM, and wherein the initial speed of the inner vessel in the second stage rotates above 100 RPM; and wherein the inner vessel in the first stage rotates at a speed of approximately 295 RPM, and wherein the initial speed of the inner vessel in the second stage is approximately 295 RPM and the second speed of the inner vessel in the second stage is approximately 200 RPM.

12. A method for forming tools having a smooth surface finish comprising the steps of:

providing a high speed rotational processing apparatus having an outer vessel and at least one inner vessel;

placing a plurality of tools into the inner vessel, each tool being spaced apart from an adjacent tool so as not to touch during rotation;

adding a first abrasive media into the inner vessel;

rotating the inner vessel in a first stage at a first rotational speed relative to the outer vessel such that the inner vessel rotates about its axis of rotation and about the axis of rotation of the outer vessel, the rotation causing the first abrasive media to repeatedly contact the surface of the tools, the contact producing material removal of the surface of the tools;

removing the first abrasive media from the inner vessel;

adding a second abrasive media into the inner vessel, the second abrasive media being different from the first abrasive media;

rotating the inner vessel the vessel in a second stage at an initial speed relative to the outer vessel such that the inner vessel rotates about its axis of rotation and about the axis of rotation of the outer vessel for a initial period of time;

slowing the rotation of the inner vessel in the second stage to a second speed and rotating the inner vessel at that speed for a second period of time, the second speed being less than the initial speed and the speed of rotation during the first stage; and removing the tools from the inner vessel;

wherein the step of placing a plurality of tools into the inner vessel involves mounting the plurality of tools to a fixture so that each tool is spaced from an adjacent tool, and placing the fixture into the vessel;

wherein the inner vessel in the first stage rotates at a speed above approximately 100 RPM, and wherein the initial speed of the inner vessel in the second stage rotates above 100 RPM; and wherein the inner vessel in the first stage rotates at a speed above approximately 250 RPM for at least approximately 15 minutes, and wherein the initial speed of the inner vessel in the second stage is above approximately 250 RPM for at least approximately 15 minutes, then reduced to a speed below 250 RPM for at least approximately 15 minutes, and wherein the media in the first stage includes silicon carbide and the media in the second stage includes aluminum oxide.

13. A method according to claim 8 wherein the first abrasive iincludes silicon carbide and the second abrasive includes aluminum oxide.

14. A method according to claim 8 wherein the first time period is at least approximately 30 minutes.

15. A method according to claim 8 wherein the first time period is at least approximately 30 minutes and the initial period of time of the second state is approximately 60 minutes.

16. A method according to claim 8 wherein the second period of time is at least approximately 30 minutes.

17. A method according to claim 1 wherein the first abrasive includes silicon carbide and the second abrasive includes aluminum oxide.

18. A method according to claim 1 wherein the first time period is at least approximately 30 minutes.

19. A method according to claim 1 wherein the first time period is at least approximately 30 minutes and the initial period of time of the second state is approximately 60 minutes.

20. A method according to claim 1 wherein the second period of time is at least approximately 30 minutes.

21. A method according to claim 1 wherein before the second stage, the method comprises the steps of:

removing the tools from the inner vessel;

sharpening at least a portion of the tools; and placing the tools back into the inner vessel.

22. A method according to claim 8 wherein before the second stage, the method comprises the steps of:

removing the tools from the inner vessel;

sharpening at least a portion of the tools; and placing the tools back into the inner vessel.

* * * * *